Oct. 31, 1961      H. S. SHAFFER      3,006,780
CELLULAR COATING AND METHOD OF PRODUCING THE SAME

Filed Nov. 4, 1959      2 Sheets-Sheet 1

INVENTOR,
HARRY S. SHAFFER

BY
ATTORNEYS

Oct. 31, 1961 H. S. SHAFFER 3,006,780
CELLULAR COATING AND METHOD OF PRODUCING THE SAME
Filed Nov. 4, 1959 2 Sheets-Sheet 2

INVENTOR
HARRY S. SHAFFER

BY *Tashof & Ascheroff*

ATTORNEYS

United States Patent Office 3,006,780
Patented Oct. 31, 1961

3,006,780
CELLULAR COATING AND METHOD OF
PRODUCING THE SAME
Harry S. Shaffer, Cincinnati, Ohio
(1040 SE. 7th Ave., Pompano Beach, Fla.)
Filed Nov. 4, 1959, Ser. No. 850,862
25 Claims. (Cl. 117—18)

The present invention is directed to a base having a cellular resin coating thereon and methods of producing the same.

More particularly, according to the present invention, expandable resin beads are adhered to a base and the beads are expanded in situ to provide a cellular resin coating. According to the preferred aspect of the invention, the beads are applied to at least one surface of the base to form a substantially continuous layer generally one bead deep and the beads are then heated to expand them in situ to form a cellular layer. The preferred resin is polystyrene.

The article produced according to this method comprises a base having adhered thereto a substantially continuous cellular resin layer composed of in situ expanded resin beads, the periphery of said beads remote from the base being generally spheroidal, the lateral walls of the beads being adhered to each other throughout substantially their entire extent, the outer surface of the layer being textured and presenting the appearance of agglomerated globules. The preferred base comprises a container such as a bucket which bucket may be made of any material and is preferably made of paperboard having an impervious liner.

An object of the present invention is to provide a base having an adherent cellular insulating coating providing a highly ornamental appearance.

A further object of the invention is to provide a method of producing a highly ornamental cellular insulating layer on a base.

A further object of the invention is to provide a paperboard bucket having an insulating ornamental cellular coating.

A further object of the invention is to provide an insulating cellular layer adherent to a base wherein said layer is prepared by expanding expandable polystyrene beads while said beads are adhered to a surface of said base.

These and other objects of the present invention will be readily apparent from the following description taken in conjunction with the accompanying drawings wherein.

Figure 1:
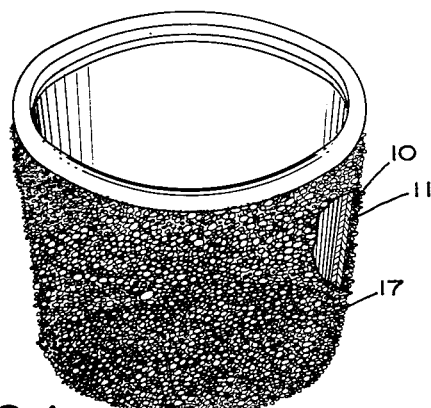
FIG. 1 is a perspective view partly in section of a bucket made in accordance with the present invention.

Referring to FIG. 1, there is shown an ice bucket comprising a paperboard base 10, a fluid impervious liner 11 and an outer coating 17 constituted by in situ expanded resin beads. Briefly, this bucket is made by providing a paperboard bucket with a fluid impervious liner 11 by coating the interior of the bucket with a solution or a dispersion of a resin such as polystyrene and drying the bucket to leave therein an impervious liner. For example, the interior of the bucket may be coated with a solution of polystyrene sold under the name of "At-lac" by Atlas Powder, Delaware. The exterior of the bucket is then brushed to apply a uniform coating of an adhesive and there is spread over the adhesive before the adhesive has set a layer of expandable resin beads. The adhesive is then set and the bucket with the beads adherent thereto is heated until the beads expand. The production of the coating 17 will be described in detail in the following example.

*Example*

Figure 2:
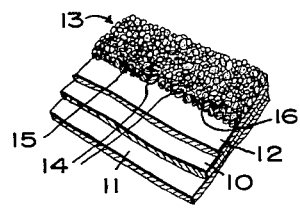
FIG. 2 is a fragmentary enlarged view partly in section and partly in elevation of the bucket of FIG. 1 showing the expandable beads prior to expansion.

By way of example and referring more particularly to FIG. 2, the exterior of the paperboard bucket 10 is uniformly coated with an adhesive such as polyvinyl acetate emulsion. Before the adhesive has set, that is, while the adhesive is tacky, expandable polystyrene beads are sprinkled onto the tacky cement layer until the exterior of the bucket is coated with a substantially continuous layer of beads. The expandable polystyrene beads are commercially available under the trade name "Pelaspan 8" sold by the Dow Chemical Company. Pelaspan 8 beads are generally spherical in shape and have a translucent white color. The beads are supplied in mixtures of various diameters and their particle sizes (test method ASTM D 392–38) are such that less than 1% will be retained on a U.S. standard #12 sieve; less than .5% will pass through a U.S. standard #35 sieve, and more than 98.5% will fall between 0.50 and 1.68 mm. It may be said that these beads have an average diameter of .8 mm. These beads comprise particles of polystyrene which have been steeped in a volatile liquid such as freon, pentane, hexane, etc. or other expanding agent. The production of such beads is more particularly described in U.S. Patents Nos. 2,681,321 and 2,857,342 and any of the beads therein described may be used herein.

In FIG. 2, the layer of unexpanded beads is identified by numeral 13 and the adhesive is shown at 12. The adhesive 12 is applied to provide a uniform layer having such a depth that the beads adhere thereto in a layer substantially one bead deep. As shown in FIG. 2, most of the beads such as beads 14 contact the adhesive while occasionally beads such as 15 and 16 do not contact the adhesive but still remain on the exterior of the bucket. Many of the beads contact each other and in many cases there are small spaces between the beads, these small spaces being generally too small to accommodate another bead. By "substantially continuous layer" is meant that the beads generally cover the adhesive with the spaces between the beads being generally too small to accommodate other beads. It is also apparent from FIG. 2 that the beads are not completely embedded in the adhesive. In other words, the surface of the beads remote from the base 10 are not covered with adhesive. This bucket with the adherent beads is then maintained in the atmosphere until the adhesive is set so that the beads are firmly secured to the bucket. The entire assembly is then placed in an oven and heated to a temperature of approximately 200° F. for approximately 15 minutes. This heating causes expansion of the volatile liquid or expanding agent contained within the beads and causes expansion of the beads in all directions.

Figure 3:
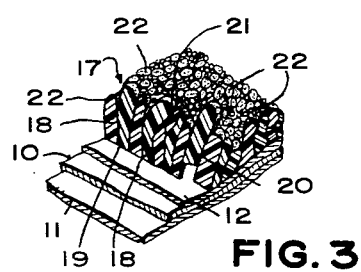
FIG. 3 is an enlarged section corresponding to FIG. 2 showing the structure of the beads after expansion.

The expansion of the beads is illustrated in FIG. 3. Since the beads expand 20 to 30 times their original volume, lateral expansion quickly causes the spaces between the beads to be filled and the lateral walls 18 of the beads become united to each other through the effect of heat and lateral pressure. Substantially all the lateral walls of the beads are adhered to each other throughout substantially their entire extent. The lateral walls of the beads adhere to each other autogenously while the bottoms of the beads, that is, the surface nearest the base are adhered to the base by means of the adhesive. Since the beads can no longer expand laterally, they expand in a direction away from the base and form elongated cells such as shown at 17. Virtually all the beads which were initially held by the adhesive remain bonded to the paperboard bucket 10 as shown at 19. Occasionally when an unexpanded bead was secured to the bucket but spaced from the adhesive as occurred with bead 15 in FIG. 2, the expanded bead may also be spaced from the surface of the bucket as shown by bead 20.

In the finished article there also may be occasional beads such as 21 which have no part of their surface contacting the surface of the bucket. However, as is apparent from FIG. 3, the majority of beads are adhesively directly united to the surface of the bucket and the free ends of such beads assume a generally spheroidal shape 22. In other words, the peripheries of the beads remote from the surface of the bucket are generally spheroidal or have a compound curved surface. This effect is obtained because during the expansion or heat treatment of the beads there is no inward pressure on the outer peripheries of the beads and the beads are free to expand in an outward direction.

This is contrary to some of the prior art practices wherein expandable beads were confined within a mold and curing expansion, the beads were pressed against the surface of the mold so that the outer surface of the beads took the configuration of the mold.

After the beads have been expanded, the bucket is removed from the oven and cooled.

In the above example, the beads were made of polystyrene. It is apparent that the particular resin of which the beads are constituted is not critical. The beads may be made of any thermoplastic resin. However, in the preferred form of the invention the beads are made of polystyrene or other equivalent homo-polymer or interpolymer of styrene and homologues thereof. The preferred interpolymers of styrene contain at least 85% by weight of styrene copolymerized with any comonomer interpolymerizable therewith. Examples of such comonomers include butadiene and the acrylate and methacrylate esters. All or a part of the styrene may be replaced with its closely related homologues such as alpha-methylstyrene, p-methylstyrene, p-ethylstyrene, 2,4-dimethylstyrene. For convenience, these homopolymers and copolymers will be referred to as polystyrene.

Instead of using a polyvinyl acetate adhesive, any other adhesive can be used. For example, there may be used aqueous rubber cements, solvent rubber cements, cellulose nitrate cements, thermoplastic emulsions or solutions, and/or thermosetting adhesives such as epoxy resins, urea-formaldehyde resins or melamine formaldehyde resins. Furthermore, it is not necessary that the adhesive set by air drying at room temperature. The adhesive may set utilizing heat. For example, the base 10 may be coated with an adhesive and the layer of beads applied thereto and the assembly heated at a temperature below the temperature at which significant expansion of the beads occurs. The heating of the bucket to set the adhesive and to expand the beads may be a continuous operation wherein the temperature is raised gradually to first set the adhesive and then to expand the beads.

Similarly, the temperature at which the beads are heated to cause expansion is not critical. When utilizing expandable polystyrene beads, substantial expansion begins at about 180° F. and in general the beads may be heated between a temperature of 180° F. and about 275° F. or 300° F. for a time sufficient to expand the beads. Preferably, the beads are heated to a temperature above 200° F. Of course, the temperature should not approach the melting point of the resin. Polystyrene beads, for example, melt at about 330° F. and, therefore, a maximum desirable temperature is about 275 to 300° F. As the melting point of the resin is approached, the expanded beads begin to flow and collapse and, of course, this is to be avoided.

The beads may be translucent white as supplied by the manufacturer or the beads may be dyed or pigmented. Examples of pigmented beads are set forth in U.S. Patent No. 2,857,342. When dyeing the beads, the beads are immersed in a solution of an oil-soluble dye in a solvent such as naptha, Stoddard's solvent or similar petroleum fraction. To insure better penetration of the dye a small amount of carbon tetrachloride, or perchlorethylene or acetone may be added to the dye solution. Alternatively, the color can be applied to the beads after the beads have been adhesively attached to the container either before or after expansion of the beads by the application thereto of a solution of dye or pigment in the conventional manner of coloring polystyrene materials. Furthermore, if desired after the beads have been expanded in situ, the exposed surface thereof may be coated with any desirable coating material.

It is apparent that the coating produced as above described comprises a plurality of discrete porous cells having an excellent insulating value. In addition to the insulating value, the surface of the coating is highly ornamental and produces an excellent decorative effect. The surface is textured because of the free expansion of the beads away from the base, that is, the surface is somewhat rough and has the appearance of agglomerated globules. A container coated in this manner can be used as a bucket for ice to reduce the melting of the ice or alternatively can be used as a container for other materials hot or cold when it is desired to maintain their original temperature.

Although, in the above example, the coating of in situ expanded polystyrene beads was shown as applied to a paperboard bucket, it is apparent that the coating can be applied to any other container, it being immaterial whether the walls of the container are made of paper (including paperboard, cardboard and other waterlaid materials) wood, glass, metal, plastics, etc.

Figure 5:
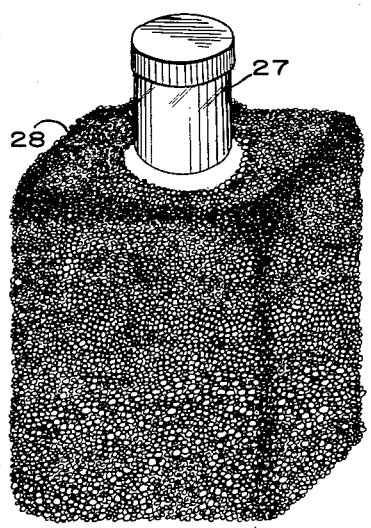
FIG. 5 is a perspective view showing a bottle having a cellular coating made in accordance with the invention.

For example, in FIG. 5, there is shown a glass bottle 27 having a coating 28 of in situ expanded polystyrene beads produced as in the above example.

Figure 4:
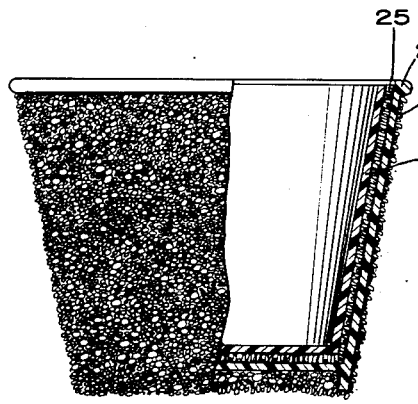
FIG. 4 is an elevation partly in section showing a modified bucket wherein there is included a removable inner liner.

In FIG. 4 there is shown another modification wherein a paperboard bucket 23 has applied thereto to both the inner surface and the outer surface a layer 25 and a layer 24 respectively of in situ expanded polystyrene beads. In this modification there may be provided a removable inner liner 26 made of metal. It is pointed out that in producing the coating of FIG. 4, both the inner and outer surfaces of the container 23 may be coated with adhesive, the beads applied thereto and then the removable liner 26 may be loosely inserted inside the container. The assembly is then heated to expand the beads.

In this modification, the presence of the liner 26 may apply a slight inward pressure to the outermost peripheries of the beads. However, this pressure is relatively slight and is not significant enough to prevent substantial free expansion of the beads although it is apparent that the outer surface of the beads may be slightly flattened to present a smoother appearance. However, in this modification, the exposed surfaces of the beads are still considered spheroidal.

Figure 6:
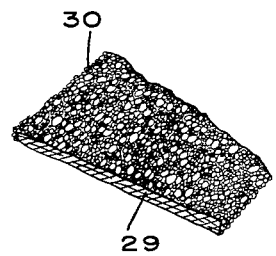
FIG. 6 is a perspective view of an insulating board having a cellular coating of in situ expanded resin beads.

FIG. 6 shows another application of the present invention wherein a layer 30 of in situ expanded beads may be formed on a rigid base 29. This base 29 may be fibreboard or metal and the assembly may be used as insulating panels.

Figure 7:
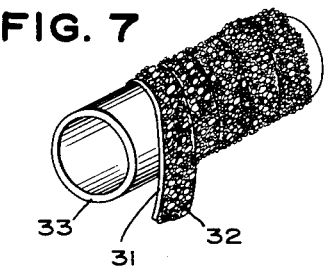
FIG. 7 shows a pipe covered with flexible insulating tape, said tape having a coating of in situ expanded resin beads.
Figure 8:
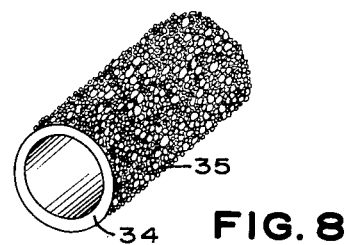
FIG. 8 is a perspective view of a pipe having an adherent coating of in situ expanded resin beads.

In FIG. 8, the base is a pipe 34 and a coating 35 is formed in situ as herein described on the exterior thereof. Alternatively, as shown in FIG. 7, the layer 32 of in situ expanded resin beads may be formed on a flexible base 31 such as paper or cloth to produce an insulating tape which may be wrapped around a pipe 33 or other similar support.

Figure 9:
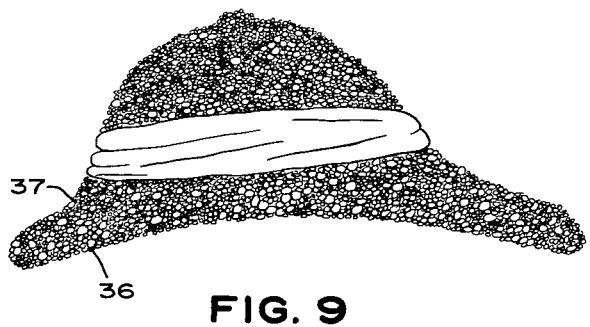
FIG. 9 is a sun helmet having the exterior surface thereof covered with in situ expanded resin beads.

In FIG. 9 there is shown another excellent application which utilizes both the ornamental and insulating effect of the in situ expanded polystyrene resin beads of the present invention. FIG. 9 shows a sun helmet 36 having the cellular layer resin 37 on the exterior thereof.

Although, in the preferred illustrated embodiments the expandable bears are secured to the base by means of an adhesive, it is apparent that these beads may be also adhered to the base by moistening the base with a solvent for the resin which will cause the resin to autogeneously adhere to the base.

In the illustrated embodiments, the expandable beads are completely expanded in situ, that is, the beads at the time they are adhered to the support have not been expanded. These beads, when heated, expand approximately 20 to 30 times their original volume and it is, therefore, apparent that the present invention includes, within its scope, partially expanding the beads before they are adhered to the base and then completing the expansion in situ. It is only necessary that the beads at the time they are adhered to the support be capable of further expansion.

Instead of expanding the beads by placing them in an oven, heat may be applied in other conventional ways. For example, heat may be applied by exposing the beads, adhered to the support, to infra-red rays.

In the preferred embodiment, when the expandable beads are adhered to the base to for a substantially continuous layer of expandable beads, when the beads are expanded, the lateral spaces between the beads are filled because of the expansion and the beads become agglomerated. That is, the lateral walls of the beads abut and become united to each other because of the heat and lateral pressure. At the same time, the beads are free to expand in a direction away from the base. This causes the beads to become elongated and the free ends of the beads assume a general spheroidal shape.

In the illustrated example, the initial expandable beads are spheroidal. However, it is apparent that the initial beads may have any shape. Although as described in connection with FIG. 3, occasional beads or small areas may not be adhered to the base, in general it may be said that the layer is adhered to the base.

Although in the preferred embodiment, in both the unexpanded article and in the final article, the layer of beads is generally one bead deep, it is apparent that successive layers of beads may be applied with expansion taking place after the application of each layer. For some purposes, it may be desirable to apply sufficient adhesive so that the layer is more than one bead deep either throughout its extent or in spaced areas. However, generally this is not desirable since the too deep layers tend to pull away from the base during the expansion step and this pulling away results in large clusters projecting considerably from the remainder of the surface and tends to weaken the layer.

When the starting layer is substantially one bead deep, because all the beads do not expand away from the base, the same amount, the final coating is of varying depth, the depth varying generally from bead to bead. To state this in another way, although the exposed beads have what may be considered spheroidal exposed surfaces, the surfaces of adjacent beads do not form a smooth curve. This effect is somewhat exaggerated when the unexpanded beads are of varying diameters.

It is apparent that the adhesive may be applied in other ways than by brushing. For example, the adhesive may be applied by roller coating, spraying, etc.

When the unexpanded beads are dyed, the final coating presents a variegated appearance since the coloring is denser or more pronounced at the junctions of the beads as compared with the coloring on the surface of the beads. This produces an unusually desirable ornamental or decorative effect.

Although the coating is preferably used for both its heat-insulating characteristics and decorative appearance, it is apparent that for certain applications, the insulating charactertistics will be more significant while for other applications, the decorative effect will be of more significance.

Although the beads become agglomerated, each bead maintains its discrete entity. Each bead contains many pores and, therefore, an excellent heat-insulating effect is obtained. Because of the varying depth of the surface of the layer, the surface is textured, that is, the surface is uneven having high and low areas.

In the prior art, ice buckets have been made from expandable polystyrene beads by filling the mold with the beads and heating the mold so that the expanded beads completely fill the cavity, the final article taking the exact shape of the mold. Such an article does not have the textured surface as obtained according to the present invention. Furthermore, it is necessary that the beads, prior to heating, substantially fill the cavity. Otherwise, the beads will all settle to the bottom of the mold. In order for the beads to fill the cavity, it is necessary to pre-expand the beads a considerable amount so that such pre-expanded beads virtually fill the mold cavity.

According to another aspect of the present invention, a structure such as an ice bucket can be made utilizing unexpanded beads by adhering the beads in sufficient quantity on a core or liner such as a paper bucket and then confining the structure in a mold and heating to expand the beads so that the cellular layer takes the configuration of the mold. This eliminates the necessity for pre-expanding the beads since the beads stay in position because of their adhesion to the base. However, such a construction is not as desirable as the previously described constructions wherein the beads are expanded substantially free of inward pressure so that the surface of the expanded layer has a desirable textured effect resembling agglomerated globules.

In the preferred embodiment, when producing an insulated bucket, the bucket has an impervious resinous liner. It is apparent that for certain applications, the inner surface of the bucket may be constituted by the paper itself. The bucket is preferably made from bleached kraft paperboard. The resinous impervious liner may be made from polystyrene as heretofore described or it may be made from polyethylene which is adhered or formed on the paper stock before the formation of the bucket.

Alternatively, a thin plastic liner can be vacuum formed from polystyrene or polyethylene or other suitable thermoplastic material and this liner may be cemented or adhered within the paper bucket after the beads have expanded. Such a vacuum formed liner may be adhered to the inside of the bucket in place of the removable liner 26 of FIG. 4 after the expansion of the beads. It is also emphasized that when a bucket is formed with a cellular coating on the inside and outside, as shown in FIG. 4, the liner may be omitted or if utilized may be inserted in the bucket after the expansion of the beads on the inside and outside.

I claim:

1. A method of providing a cellular coating on a base comprising the steps of adhesively uniting to the surface of said base a plurality of expandable resin beads and expanding said beads in situ and agglomerating said beads to provide a cellular resin coating adhered to said base.

2. A method as recited in claim 1 wherein said resin is polystyrene.

3. A method of providing an insulating cellular coating on a base comprising the steps of adhesively uniting to a surface of said base a substantially continuous layer of expandable polystyrene beads and heating said beads to expand them in situ and agglomerate said beads to provide a cellular polystyrene coating adhered to said base.

4. A method of providing an insulating cellular coating on a base comprising the steps of adhesively uniting to the surface of said base a substantially continuous layer of expandable resin beads and heating said beads without applying a significant inward pressure to the periphery of the beads remote from said base so that said beads expand laterally and transversely relative to said base to agglomerate said beads to provide said base with an adherent continuous cellular coating with said remote peripheries of said beads being generally spheroidal.

5. A method as recited in claim 4 wherein said resin is polystyrene.

6. A method as recited in claim 5 wherein the expandable beads are of varying size, their diameters being between about .5 and 1.7 mm.

7. A method of providing an insulating cellular coating on a base comprising the steps of adhesively uniting to a surface of said base a substantially continuous layer of expandable polystyrene beads, said layer being generally one bead deep and heating said beads without applying significant inward pressure to the periphery of said beads remote from said base so that the beads expand laterally and transversely relative to said base to agglomerate said beads to provide said base with an adherent continuous cellular coating with said remote peripheries of said beads being generally spheroidal.

8. A method of providing an insulating cellular coating on a container having inner and outer surfaces, comprising the steps of uniformly coating at least one of said surfaces with an adhesive, applying to said adhesive a substantially continuous layer of expandable polystyrene beads, said layer being generally one bead deep, setting said adhesive and heating said beads without applying significant inward pressure to the periphery of said beads remote from said surface so that said beads expand laterally and transversely relative to said surface to agglomerate said beads to provide said surface with an adherent continuous cellular coating with said remote peripheries of said beads being generally spheroidal.

9. A method of providing an insulating cellular coating on a container having inner and outer surfaces, comprising the steps of adhesively uniting to at least one of said surfaces a substantially continuous layer of expandable resin beads and heating said beads to expand and agglomerate said beads and provide a cellular coating adherent to said surface.

10. An article of manufacture comprising a base having adherent to at least one surface thereof a continuous cellular resin layer composed of in situ expanded agglomerated resin beads, the periphery of said beads remote from said base being generally spheroidal, the lateral walls of said beads being autogenously adhered to each other throughout substantially their entire extent, the outer surface of said layer being textured and presenting the appearance of agglomerated globules.

11. An article of manufacture as recited in claim 10 wherein said resin is polystyrene.

12. An insulated container having an interior and an exterior surface, at least one of said surfaces having adhered thereto a continuous cellular resin layer composed of in situ expanded agglomerated resin beads, said layer being generally one bead deep, the periphery of said beads remote from said surface being generally spheroidal, the lateral walls of said beads being adhered to each other throughout substantially their entire extent, the outer surface of said layer being textured and presenting the appearance of agglomerated globules.

13. A container as recited in claim 12 wherein the inner and outer surfaces have adherent thereto a continuous cellular resin layer.

14. A container as recited in claim 12 wherein said continuous cellular resin layer is on the outer surface, said container being made of paperboard and having a fluid impervious inner liner.

15. A container as recited in claim 12 wherein at least the inner surface thereof has adherent thereto said cellular resin layer and wherein said container includes a removable fluid impervious liner inward of said cellular layer.

16. An article of manufacture as recited in claim 10 wherein said base is flexible.

17. An insulated paperboard bucket, the outer surface of said bucket having adherent thereto a continuous cellular polystyrene layer composed of in situ expanded agglomerated polystyrene beads, the periphery of said beads remote from said surface being generally spheroidal, the lateral walls of said beads being adhered to each other throughout substantially their entire extent, the outer surface of said layer being textured and presenting the appearance of agglomerated globules, said layer being generally one bead deep.

18. A bucket as recited in claim 17 including a fluid impervious inner liner.

19. An article of manufacture comprising a base having adherent to at least one surface thereof a continuous cellular resin layer composed of in situ expanded agglomerated resin beads, the periphery of said beads remote from said base being generally spheroidal, the outer surface of said layer being textured and presenting the appearance of agglomerated globules.

20. A method of providing a cellular coating on a base comprising the steps of coating said base with an adhesive, applying to said adhesive a substantially continuous layer of expandable resin beads, setting said adhesive and heating said beads without applying significant inward pressure to the periphery of said beads remote from said base so that said beads expand laterally and transversely relative to said base to agglomerate said beads and to autogenously bond the lateral walls of the expanded beads to each other to provide said surface with an adherent continuous cellular coating with said remote peripheries of said beads being generally spheroidal.

21. An article of manufacture comprising a base having adherent to at least one surface thereof a substantially continuous cellular resin layer composed of in situ expanded agglomerated resin beads, the periphery of said beads remote from said base being generally spheroidal, the lateral walls of said beads being autogenously adhered to each other throughout substantially their entire extent, the outer surface of said layer being textured and presenting the appearance of agglomerated globules.

22. A method of providing a thermal insulating cellular coating on a base comprising the steps of coating said base with an adhesive, applying to said adhesive a substantially continuous layer of expandable resin beads, said layer being generally one bead deep with the surfaces of the beads remote from said base being free of said adhesive, setting said adhesive and heating said beads without applying significant inward pressure to the periphery of said beads remote from said base so that said beads expand laterally and transversely relative to said base to agglomerate said beads and to autogenously bond the lateral walls of the expanded beads to each other to provide said surface with an adherent continuous cellular coating with said remote peripheries of said beads being generally spheroidal.

23. A method as recited in claim 22 wherein the adhesive is an aqueous adhesive.

24. A method as recited in claim 22 wherein the temperature during the heating of said beads to expand them is within the range of about 200–275° F.

25. An article of manufacture comprising a base having adherent to at least one surface thereof a substantially continuous cellular thermo-insulating resin layer composed of in situ expanded agglomerated resin beads, said layer being generally one bead deep, the periphery of said beads remote from said base being generally spheroidal, said layer being adhered to said base by an adhesive, the lateral walls of said beads being autogenously adhered to each other throughout substantially their entire extent, the outer surface of said layer being textured and presenting the appearance of agglomerated globules and being free of said adhesive.

References Cited in the file of this patent

UNITED STATES PATENTS

| | | |
|---|---|---|
| 2,110,470 | Norton | Mar. 8, 1938 |
| 2,174,425 | Schlumbohm | Sept. 26, 1939 |
| 2,629,698 | Sterling | Feb. 24, 1953 |
| 2,653,139 | Sterling | Sept. 22, 1953 |
| 2,907,682 | Eichel | Oct. 6, 1959 |
| 2,942,301 | Price et al. | June 28, 1960 |